(12) United States Patent
Knuebel

(10) Patent No.: US 10,885,654 B2
(45) Date of Patent: Jan. 5, 2021

(54) METHOD AND DEVICE FOR DETERMINING A STRAIGHTNESS VALUE OF A HAIRSTYLE

(71) Applicant: Henkel AG & Co. KGaA, Duesseldorf (DE)

(72) Inventor: Georg Knuebel, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 72 days.

(21) Appl. No.: 16/347,771

(22) PCT Filed: Jul. 4, 2017

(86) PCT No.: PCT/EP2017/066578
§ 371 (c)(1),
(2) Date: May 6, 2019

(87) PCT Pub. No.: WO2018/086772
PCT Pub. Date: May 17, 2018

(65) Prior Publication Data
US 2019/0279389 A1    Sep. 12, 2019

(30) Foreign Application Priority Data

Nov. 11, 2016   (DE) .................. 10 2016 222 194

(51) Int. Cl.
*G06T 7/60*    (2017.01)
*A45D 44/00*    (2006.01)
(Continued)

(52) U.S. Cl.
CPC ............... *G06T 7/60* (2013.01); *A45D 44/00* (2013.01); *G06T 7/44* (2017.01); *G09B 19/00* (2013.01);
(Continued)

(58) Field of Classification Search
CPC . G06T 2207/30196; G06T 2207/20104; G06T 7/60; G06T 7/44; A45D 44/00; A45D 2044/007; G09B 19/00
See application file for complete search history.

(56) References Cited

U.S. PATENT DOCUMENTS

2005/0211599 A1   9/2005  De La Mettrie et al.
2009/0280088 A1   11/2009 Hachiya et al.
(Continued)

FOREIGN PATENT DOCUMENTS

WO       2014040853 A1    3/2014

OTHER PUBLICATIONS

Fonck et al.: "Effect of Aging on Elastin Functionality in Human Cerebral Arteries", Stroke 2009; 2552-2556, downloaded from http://stroke.ahajournals.org/content/early/2009/05/28/STROKEAHA.108.528091.

(Continued)

*Primary Examiner* — Marcos L Torres
(74) *Attorney, Agent, or Firm* — Lorenz & Kopf, LLP

(57) ABSTRACT

Methods for determining the straightness value of a hairstyle are provided. In accordance with an embodiment, a method comprises: defining at least one hair analysis region in a digital image in which hair is depicted; ascertaining hair profiles of the hair depicted in the at least one hair analysis region, wherein the hair profiles of all hair depicted in the hair analysis region form a totality of the hair profiles; ascertaining a main direction of the hair profiles; and ascertaining the straightness value of the hairstyle on the basis of the main direction of the hair profiles and the totality of hair profiles.

20 Claims, 9 Drawing Sheets

(51) Int. Cl.
  *G09B 19/00* (2006.01)
  *G06T 7/44* (2017.01)
(52) U.S. Cl.
  CPC .......... *A45D 2044/007* (2013.01); *G06T 2207/20104* (2013.01); *G06T 2207/30196* (2013.01)

(56) References Cited

U.S. PATENT DOCUMENTS

| | | | | |
|---|---|---|---|---|
| 2010/0026717 | A1* | 2/2010 | Sato | G06T 7/13 |
| | | | | 345/642 |
| 2010/0106679 | A1 | 4/2010 | Yamaguchi et al. | |
| 2013/0306095 | A1* | 11/2013 | Syed | A45D 7/06 |
| | | | | 132/204 |
| 2014/0279192 | A1* | 9/2014 | Selby | G06Q 30/0631 |
| | | | | 705/26.7 |
| 2018/0300581 | A1* | 10/2018 | Iftikhar | G06K 9/4604 |
| 2020/0090353 | A1* | 3/2020 | Mueller | G06K 9/3233 |

OTHER PUBLICATIONS

EPO, International Search Report issued in International Application No. PCT/EP2017/066578, dated Sep. 18, 2017.

N. Lechocinski et al: "Fiber orientation measurement using polarization imaging", Journal of Cosmetic Science, vol. 62, (Mar./Apr. 2011) pp. 85-100.

Anonymous: "Quantitative orientation analysis", (URL: http://bigwww.epfl.ch/demo/orientation/theoretical-background.pdf), Mar. 14, 2016 (Mar. 14, 2016), XP055403676 [retrieved on Sep. 4, 2017].

Zsuzsanna Püspöki et al: "Transforms and Operators for Directional Bioimage Analysis: A Survey", In: "Advances in Anatomy, Embryology and Cell Biology", Jan. 1, 2016 (Jan. 1, 2016), vol. 219, pp. 69-93, Springer, Heidelberg, DE; XP055403983, ISSN: 0301-5556.

* cited by examiner

| Nr. | Xc | Yc | Zc | Zone | Ellip. | Prefilter | Energy | Orientation | Coherence |
|---|---|---|---|---|---|---|---|---|---|
| 1 | 350 | 350 | 1 | ✓ | ✓ | 0,00 | 396,54 | -61,09 | 0,160 |

| Nr. | Xc | Yc | Zc | Zone | Ellip. | Prefilter | Energy | Orientation | Coherence |
|---|---|---|---|---|---|---|---|---|---|
| 1 | 350 | 350 | 1 | ✓ | ✓ | 0,00 | 317,87 | 40,74 | 0,804 |

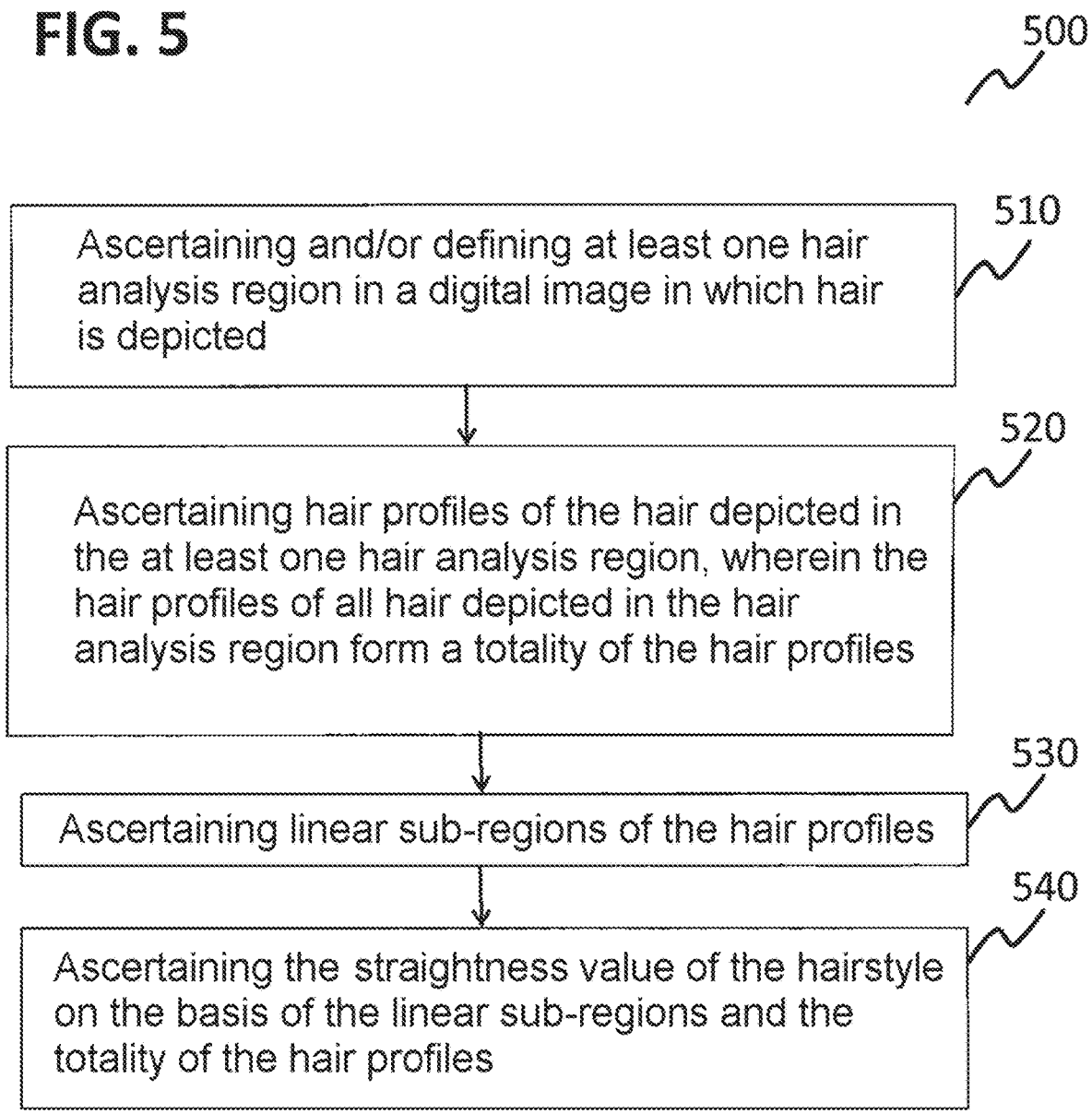

METHOD AND DEVICE FOR DETERMINING A STRAIGHTNESS VALUE OF A HAIRSTYLE

CROSS-REFERENCE TO RELATED APPLICATION

This application is a U.S. National-Stage entry under 35 U.S.C. § 371 based on International Application No. PCT/EP2017/066578, filed Jul. 4, 2017, which was published under PCT Article 21(2) and which claims priority to German Application No. 10 2016 222 194.9, filed Nov. 11, 2016, which are all hereby incorporated in their entirety by reference.

TECHNICAL FIELD

The present disclosure relates to a method and a device for determining the straightness value of a hairstyle.

BACKGROUND

The straightening of hair can constitute an important cosmetic objective, which can be attained by employing a number of different methods. Conversely, a crimping or curling may also be desired.

Such methods include, for example, a use of non-reactive haircare products for hair straightening, for example products that are intended to be left on the hair and are also then referred to as leave-on products (for example "conditioners"), and/or products which are intended to be removed again from the hair, for example rinsed out, following application, for example hair masks.

Hair-straightening methods also include applications of reactive products, such as perms (which can be suitable for providing the hair with a relatively permanent desired structure which is not only wavy, but may also be straight), or what are known as straighteners and relaxers.

In further hair-straightening methods, hairstyling tools may be used, such as straightening irons.

Assessment of a straightening result, and possibly also a straightness of the hair to be straightened, was performed until now either subjectively, i.e. the hair is examined visually after the straightening (and possibly also beforehand) and an assessment is made as to whether a satisfactory straightening has been attained, or the hair is assessed indirectly by use of surrogate methods. For example, a combability of the hair can be determined as a surrogate method of this type and can make it possible to ascertain the straightness of the hair indirectly.

A determination of this kind (for example quantification) of the combability can be performed relatively complexly in a laboratory, but is not suitable for an end user, and also cannot be used by employing a mobile application.

There is thus a need for a quantitative assessment of the straightness of hair, for example of a hairstyle. Simple practicability without any, or with only low equipment outlay would also be desirable here, such that the straightness of the hair can be determined also by a user, for example. Furthermore, other desirable features and characteristics will become apparent from the subsequent detailed description and the appended claims, taken in conjunction with the accompanying drawings and the foregoing technical field and background.

BRIEF SUMMARY

In accordance with an exemplary embodiment, a method for determining the straightness value of a hairstyle is provided. The method comprises defining at least one hair analysis region in a digital image in which hair is depicted and ascertaining hair profiles of the hair depicted in the at least one hair analysis region. The hair profiles of all hair depicted in the at least one hair analysis region forms a totality of the hair profiles. A main direction of the hair profiles is ascertained and the straightness value of the hairstyle is ascertained on the basis of the main direction of the hair profiles and the totality of hair profiles.

In accordance with another exemplary embodiment, a device for determining the straightness value of a hairstyle is provided. The device comprises a data processing device and a display device. The data processing device is configured to: define at least one hair analysis region in a digital image in which hair is depicted; ascertain hair profiles of the hair depicted in the at least one hair analysis region, wherein the hair profiles of all hair depicted in the hair analysis region form a totality of the hair profiles; ascertain a main direction of the hair profiles; and ascertain the straightness value of the hairstyle on the basis of the main direction of the hair profiles and the totality of hair profiles.

In accordance with a further exemplary embodiment, a method for tailored hair treatment is provided. The method comprises defining at least one hair analysis region in a digital image in which hair is depicted and ascertaining hair profiles of the hair depicted in the at least one hair analysis region. The hair profiles of all hair depicted in the at least one hair analysis region form a totality of the hair profiles. A main direction of the hair profiles is ascertained and a straightness value of the hair depicted in the at least one hair analysis region is ascertained on the basis of the main direction of the hair profiles and the totality of the hair profiles. The method further comprises outputting an individual treatment instruction depending on the ascertained straightness value.

BRIEF DESCRIPTION OF THE DRAWINGS

The present disclosure will hereinafter be described in conjunction with the following drawing figures, wherein like numerals denote like elements, and wherein:

FIG. 5 shows a flow diagram of a method for ascertaining a straightness value of a hairstyle in accordance with various exemplary embodiments.

DETAILED DESCRIPTION

Figure 1A:
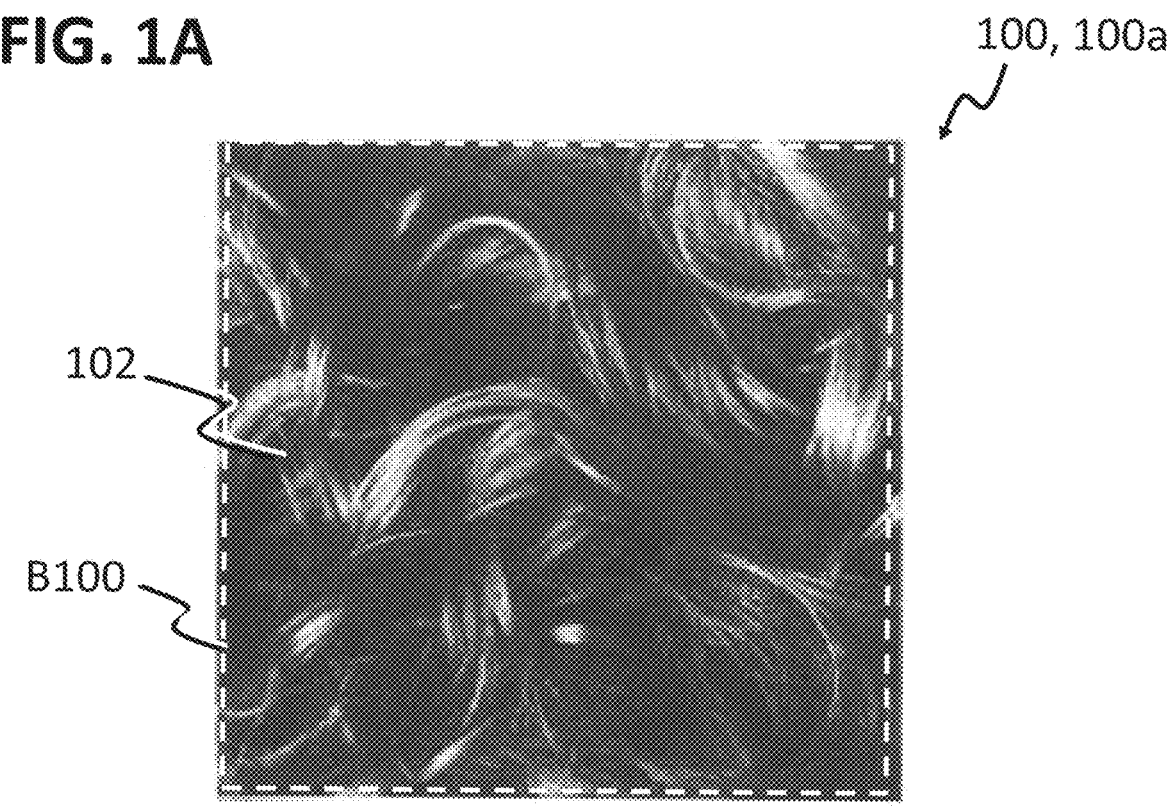
FIG. 1A and FIG. 1B show images of hair straightened to different extents for use in a method for ascertaining a straightness value of a hairstyle in accordance with various exemplary embodiments.

The following detailed description is merely exemplary in nature and is not intended to limit the disclosure or the application and uses of the subject matter as described herein. Furthermore, there is no intention to be bound by any theory presented in the preceding background or the following detailed description.

Reference is made in the following detailed description to the accompanying drawings, which form part of the present disclosure and in which specific embodiments in which the present disclosure can be carried out are shown by way of illustration. In this regard, directional terms such as "above", "below", "ahead", "behind", "front", "rear", etc. are used in relation to the orientation of the described figure(s). Since components of embodiments can be positioned in a number of different orientations, the directional terms are used by way of illustration and are in no way limiting. It goes without saying that other embodiments can be used and structural or logical changes can be made without departing from the scope of protection of the present disclosure. It goes without saying that the various exemplary embodiments described herein can be combined with one another unless specifically stated otherwise. The following detailed description therefore is not to be interpreted as limiting, and the scope of protection of the present disclosure is defined by the accompanying claims.

In various exemplary embodiments a method is provided which makes it possible to determine, for example to ascertain, the straightness of hairstyles in a precise manner as a target parameter of an image processing method (image processing can also be referred to as image analysis).

In various exemplary embodiments the method can be performed with only little or no equipment outlay. For example, the method can be performed by employing an app on a tablet or a smartphone. For example, this can allow a user to determine the straightness value of their hairstyle even without professional assistance and without having to provide a hair sample for examination, for example using a smartphone or tablet for recording a digital image of the hairstyle and with the straightness value being determined by employing the smartphone/tablet, wherein the smartphone/tablet can be used in various exemplary embodiments to provide the image to an external data processing device, for example a cloud, and to receive the results determined there and to display them to the user.

In various exemplary embodiments a method for determining the straightness value of a hairstyle is provided. The method may comprise a step of ascertaining and/or defining at least one hair analysis region in a digital image, in which hair is depicted, a step of ascertaining hair profiles of the hair depicted in the at least one hair analysis region, wherein the hair profiles of all hair depicted in the hair analysis region form a totality of the hair profiles, a step of ascertaining a main direction of the hair profiles, and a step of ascertaining the straightness value of the hairstyle on the basis of the main direction of the hair profiles and the totality of hair profiles.

In various exemplary embodiments the ascertainment of the straightness value of the hairstyle on the basis of the main direction of the hair profiles and the totality of hair profiles may comprise ascertaining a coherence with use of a structure tensor and/or ascertaining a dispersion of an angular distribution of the totality of hair profiles.

In various exemplary embodiments the step of ascertaining and/or defining at least one hair analysis region may comprise defining the at least one hair analysis region by a user.

In various exemplary embodiments the step of defining the at least one hair analysis region by the user may comprise defining the position and/or shape and/or size of the hair analysis region.

In various exemplary embodiments the step of ascertaining and/or defining at least one hair analysis region may comprise determining a hair display region in which the hair is depicted in the digital image, and defining at least part of the hair display region as the at least one hair analysis region.

In various exemplary embodiments the at least one hair analysis region may comprise the entire hair display region.

In various exemplary embodiments the at least one hair analysis region may comprise a plurality of hair display regions.

In various exemplary embodiments the plurality of hair analysis regions may differ from one another in their center-point position.

In various exemplary embodiments the plurality of hair analysis regions may differ from one another in their size.

In various exemplary embodiments the plurality of hair analysis regions may have a common center-point position.

In various exemplary embodiments the method may also comprise creating a relation of the ascertained straightness value to the center-point positions of the hair analysis regions.

In various exemplary embodiments the method may also comprise creating a relation of the determined straightness values of the hairstyle to the size of the hair analysis regions.

In various exemplary embodiments the method may also comprise a step of displaying the determined results.

In various exemplary embodiments a device for determining the straightness of hairstyles is provided. The device may comprise a data processing device and a display device, wherein the device may be designed to carry out one of the above methods.

A digital image can be understood herein to mean a data packet which can be displayed by a data processing system as a two-dimensional (planar) arrangement of image dots (also referred to as pixels), for example in a coordinate system which has an x-axis and a y-axis, wherein each image dot comprises at least one image position as x,y-coordinate pair and intensity information, wherein the intensity information for example can be displayed as the color of a pixel of a monitor or a printed dot of a printed image. The intensity information can relate in a color image to individual color channels. The digital image can be for example a photo recorded using a digital camera or an individual image of a video sequence recorded using a digital camera.

Figure 1B:
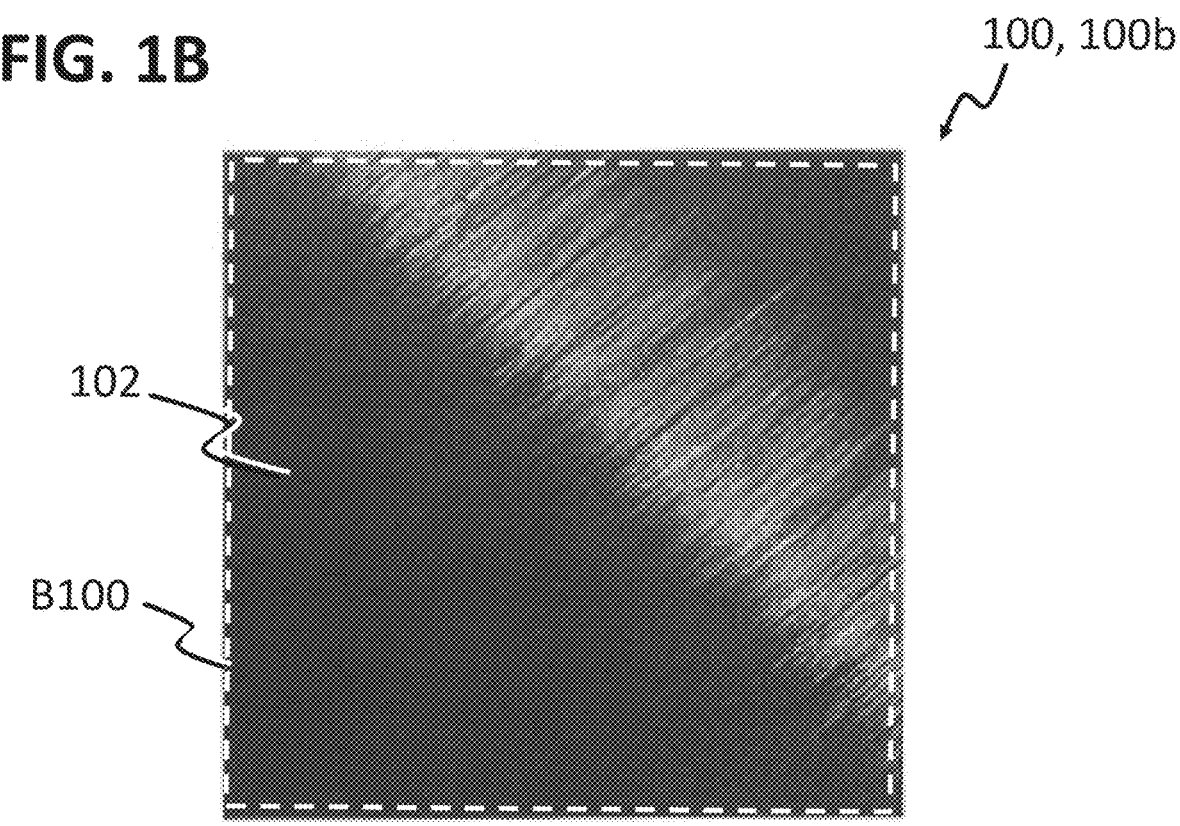

FIG. 1A and FIG. 1B show images 100 of hair straightened to different extents for use in a method for ascertaining a straightness value of hairstyles in accordance with various exemplary embodiments.

FIG. 1A shows an illustration of a digital image 100a of curly hair 102. FIG. 1B shows an illustration of a digital image 100b of straight hair 102.

In order to quantify the difference in the straightness of the hair from FIG. 1A and from FIG. 1B immediately evident to the viewer, an image processing method can be performed in various exemplary embodiments on each of the images.

The method will first be explained with reference to FIG. 1A.

In order to be able to perform the method for ascertaining the straightness of hairstyles in accordance with various exemplary embodiments, the image 100a, which shows the hair 102 (in this case curly hair), can be provided digitally. The digital image 100a can be provided for example to a data processing device.

In various exemplary embodiments at least one hair analysis region B100 can be determined in the image 100a.

In the exemplary embodiments shown in FIG. 1A and FIG. 1B the hair analysis region B100 comprises substantially the entire region of the digital image 100, 100a, 100b and is rectangular, for example square.

In various exemplary embodiments the hair analysis region B100 may comprise a partial region of the hair analysis region.

In various exemplary embodiments the digital image 100 may also comprise, in addition to the hair display region, further display regions in which for example objects, body parts, etc. may be displayed. The hair analysis region B100 may be selected in various exemplary embodiments such that no part of the other display regions falls in the hair analysis region B100.

In various exemplary embodiments the hair analysis region B100 may have any form, for example the hair analysis region B100, apart from being rectangular, may also be triangular, polygonal with a number of sides other than three or four, elliptical, round or shaped in any other way. For example, the hair analysis region B100 may comprise the entire region displayed in the digital image 100, in which hair 102 (for example main hair, i.e. for example without eyebrows, beard, etc.) is depicted (also referred to as the hair display region). The hair display region may comprise a plurality of image dots of a digital image 100, which depict the hair 102 and which can form a continuous area or an area existing of a plurality of individual areas. A plane in which the hair region can be arranged can be determined for example by the x-axis and the y-axis of the digital image.

In various exemplary embodiments in which the hair analysis region B100 comprises the entire hair display region, the hair analysis region B100 may consequently have a one-part or multi-part area which can be examined for a subsequent analysis, for example for a determination of a value for a proportion of linear regions and/or for a distribution of linear regions, even in the case of the multi-part area as a single hair analysis region B100.

Figure 4A:
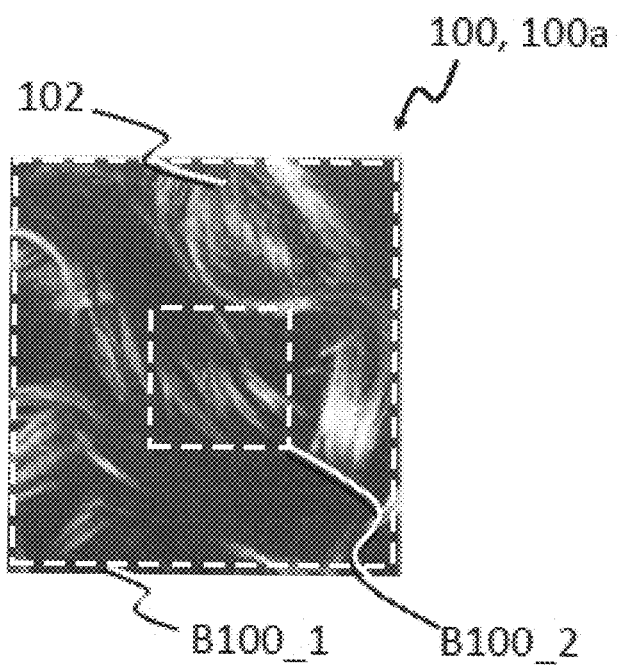
FIG. 4A and FIG. 4B show digital images of hair with multiple hair analysis regions for use in a method for ascertaining a straightness value of a hairstyle in accordance with various exemplary embodiments.
Figure 4B:
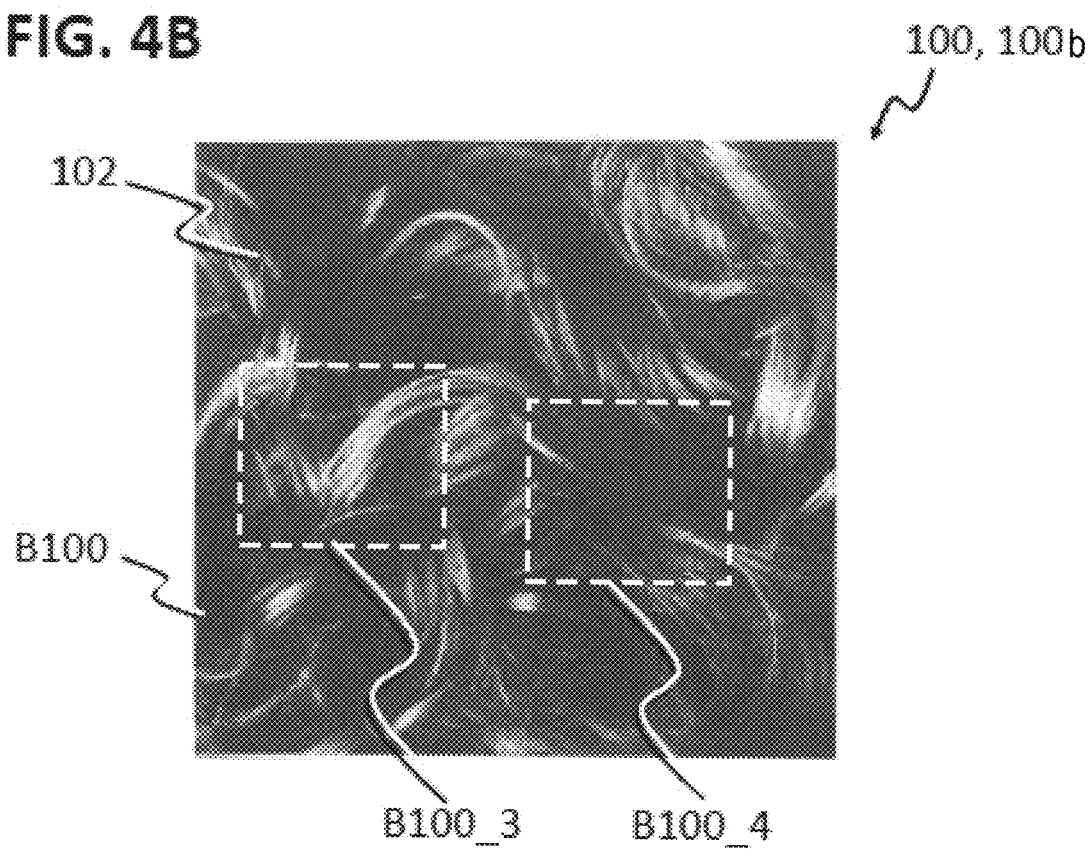
Figure 4C:
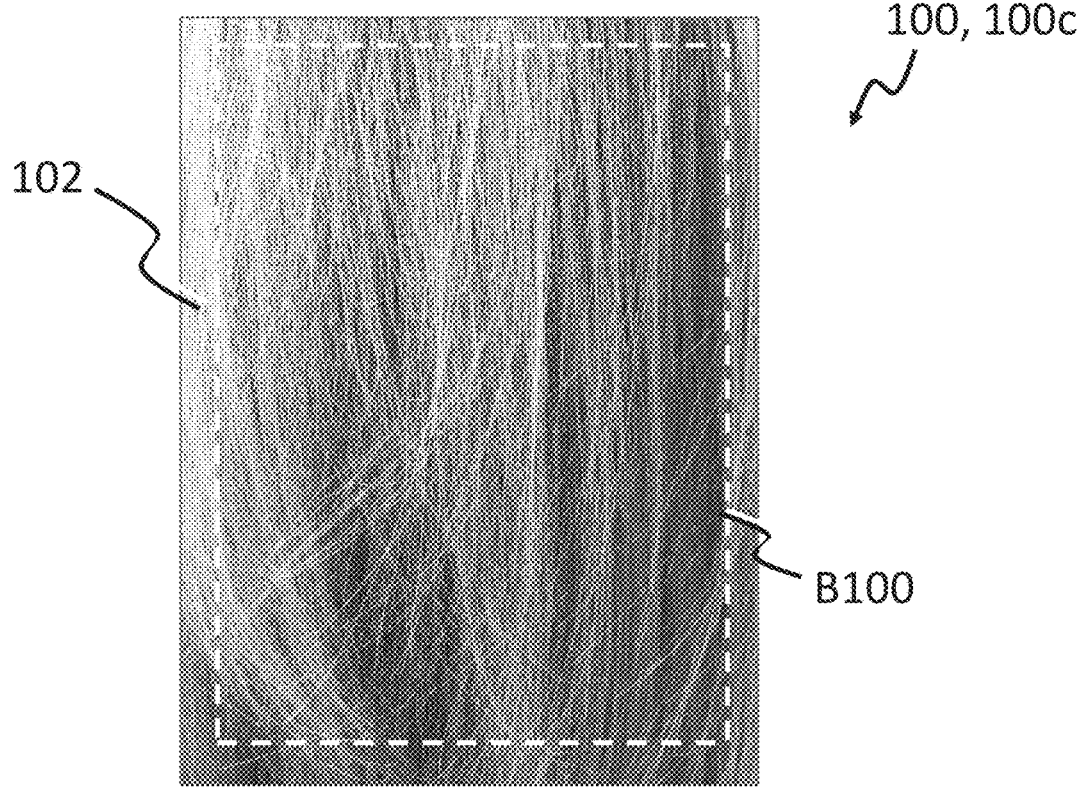
FIG. 4C to FIG. 4H show images of hair straightened to different extents for use in a method for ascertaining a straightness value of a hairstyle in accordance with various exemplary embodiments.
Figure 4D:
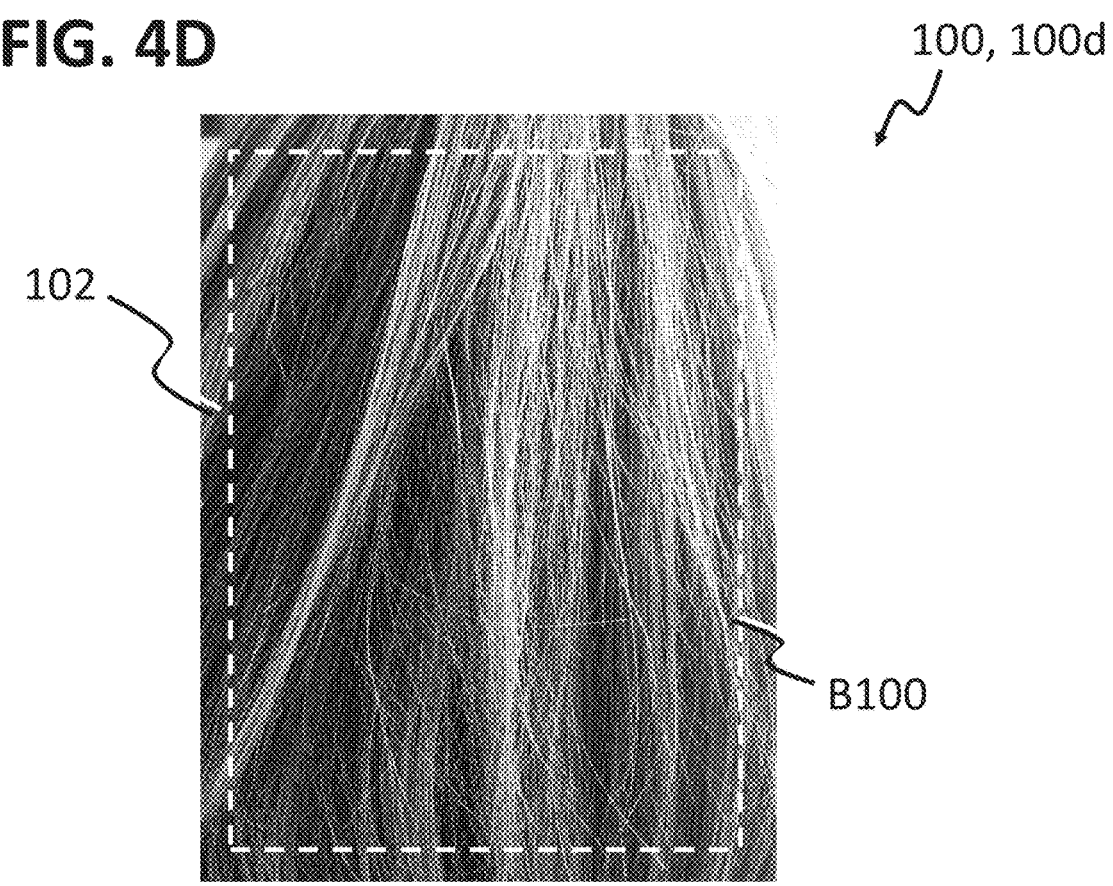
Figure 4E:
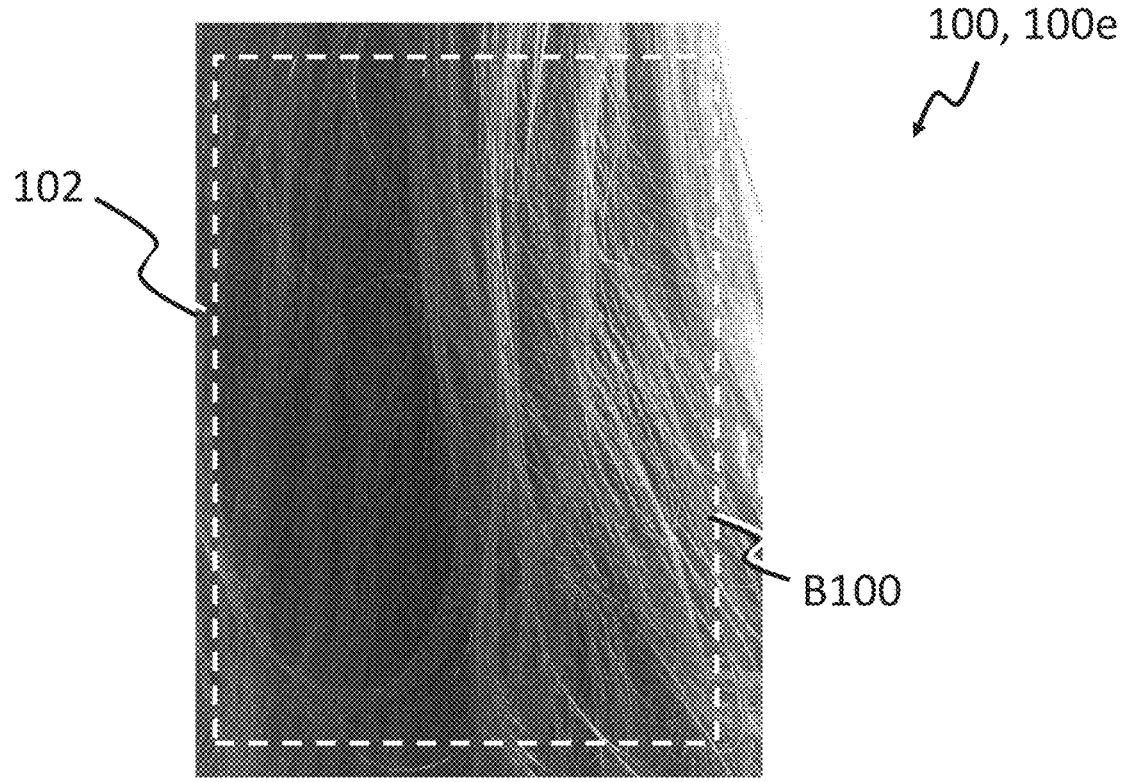
Figure 4F:
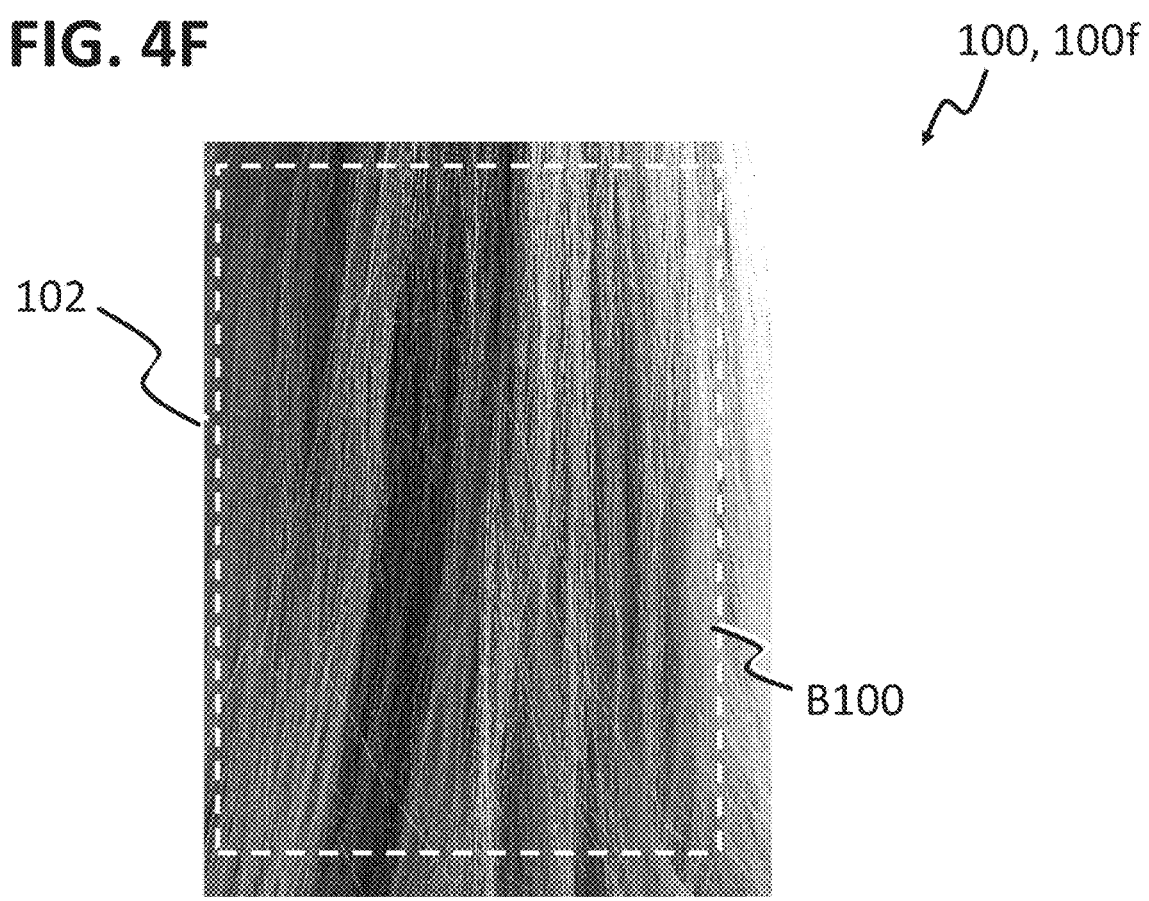
Figure 4G:
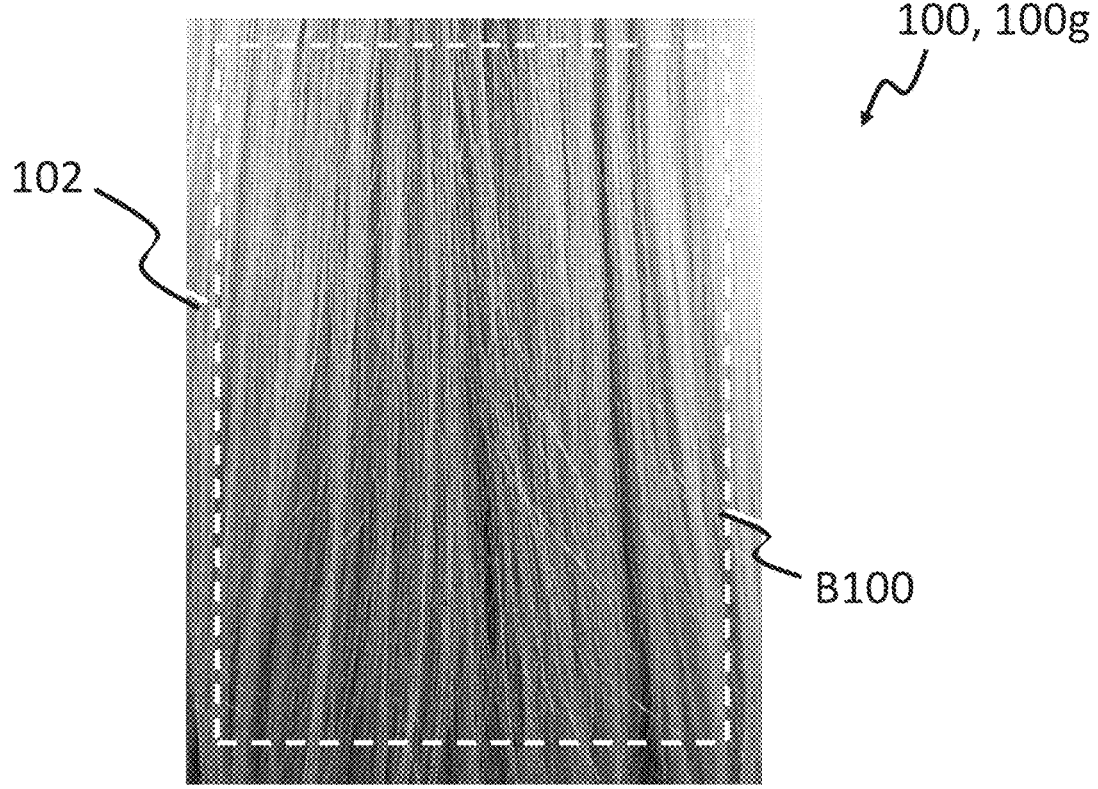
Figure 4H:
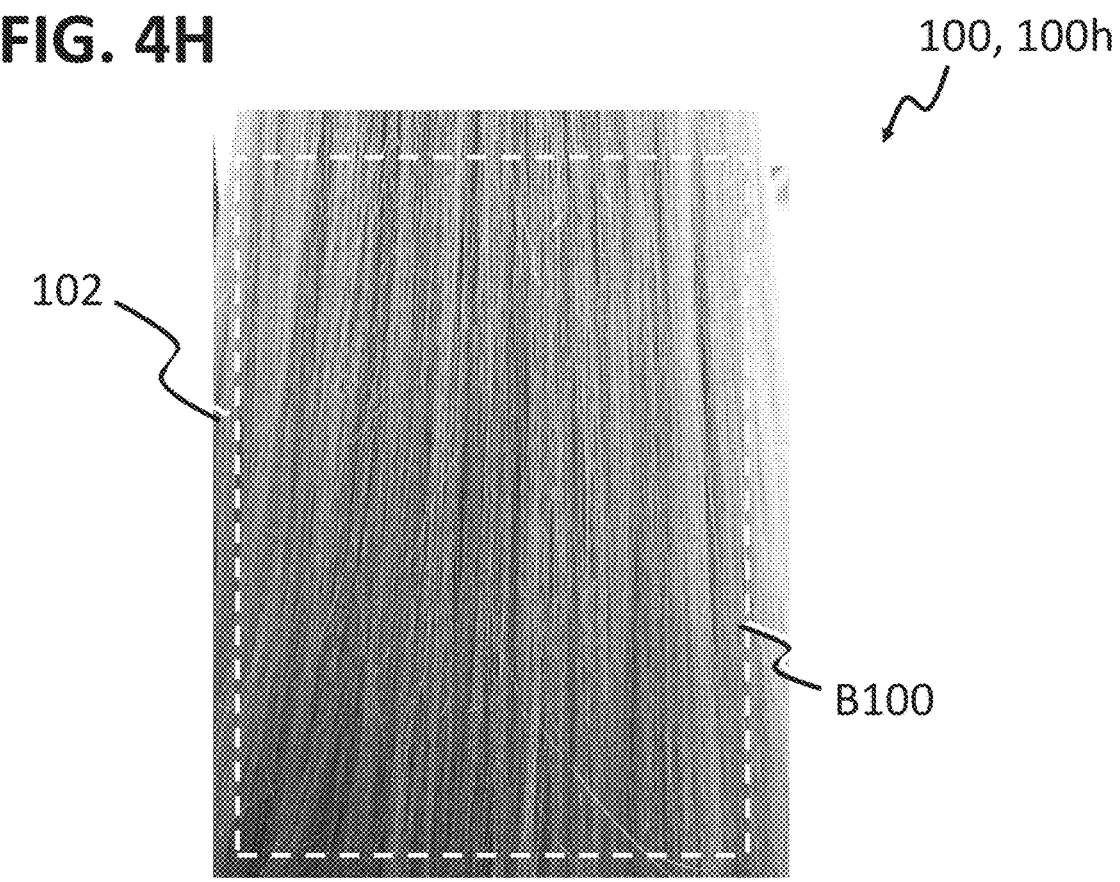

In various exemplary embodiments the at least one hair analysis region B100 may comprise a plurality of hair analysis regions B100; see for example in FIG. 4A the hair analysis regions B100_1, B100_2, or in FIG. 4B the hair analysis regions B100_3, B100_4. In various exemplary embodiments each of the plurality of hair analysis regions B100_1, B100_2 and B100_3, B100_4 can be analyzed separately in a following analysis, for example for ascertaining a value for a proportion of linear regions and/or for a distribution of linear regions, i.e., the value for a proportion of linear regions and/or for a distribution of linear regions can be ascertained separately for each of the plurality of hair analysis regions B100_1, B100_2 and B100_3, B100_4.

In various exemplary embodiments the determination of the at least one hair analysis region B100 can comprise the determination of the hair display region and the defining of the at least one hair analysis region B100. For example, the defining of the at least one hair analysis region B100 may mean that, as described above, the entire hair display region is defined as the hair analysis region B100, and/or one or more hair analysis region(s) B100 can be defined, for example in an automated manner, by employing the data processing device, for example with inclusion of predetermined conditions. For example the size and/or number of hair analysis regions B100 can be predefined, for example by employing a user, and the hair analysis regions B100 can then be defined in an automated manner, for example by employing a suitable software, for example such that, between the hair analysis regions B100, the hair display region is still covered as uniformly as possible, etc.

In various exemplary embodiments hair profiles of the hair 102 depicted in the at least one hair analysis region B100 can be determined, wherein the hair profiles of all hair depicted in the hair analysis region can form a totality of the hair profiles.

In various exemplary embodiments, in order to determine the hair profiles, an edge detection can be performed in the hair analysis region B100, in which image dots have an associated intensity value at a position determined by image coordinates x, y. Known methods, for example with use of a first derivative of the position-dependent intensity values, can be applied for the edge detection, in which regions are identified in which, along a considered direction in the hair analysis region, for the image dots arranged along this direction, the respective associated intensity values decrease or increase significantly (for example more significantly than a predefined limit value). Under consideration of a direction it may be possible to determine edges that run at an angle to the considered direction, for example perpendicularly thereto. By considering different directions, the hair profiles of the hair 102 in the hair analysis region B100 can be ascertained in different directions.

The following equations can be used in various exemplary embodiments for a description of the hair profiles:

A weighted inner product of two functions f, g each dependent on the image coordinates x, y can be represented by:

$$\langle f, g \rangle = \iint w(x,y) f(x,y) g(x,y) dx dy$$

wherein $w(x,y) \geq 0$ is a weighting function that describes the hair analysis region B100. The center-point of the hair analysis region may lie at $(x_0, y_0)$.

The first derivative in a specified direction $\theta$, which is described by a unit vector $u_\theta = (\cos\theta, \sin\theta)$, can then be described by $$D_{u_\theta} f(x,y) = u_\theta^T \nabla f(x,y), \quad (1)$$

wherein $\nabla f(x,y)$ is the gradient of the considered image.

A direction $u_{\theta_{max}}$, for which the directional derivative is maximized can be ascertained by $$u_{\theta_{max}} = \underset{\|u\|=1}{\mathrm{argmax}} \|D_u f\|_w^2, \quad (2)$$

which can be converted to $$\|D_u f\|_w^2 = \langle u^T \nabla f, \nabla f^T u \rangle_w = u^T J u$$

wherein $$J = \langle \nabla f, \nabla f^T \rangle_w = \begin{bmatrix} \langle f_x, f_x \rangle_w & \langle f_x, f_y \rangle_w \\ \langle f_x, f_y \rangle_w & \langle f_y, f_y \rangle_w \end{bmatrix}$$

is what is known as a structure tensor, which is a positive definite or defined 2×2 matrix.

A solution to equation (2) can be ascertained in that a first derivative of $u^T Ju+1-\frac{1}{2}u^T u$ it according to u is set to zero, which leads to the unit vector equation: $Ju=\lambda u$.

An intrinsic value $\lambda_{min}$ of J, at which the first derivative can be minimized, i.e. fewest edges can be encountered, which clearly may correspond to a main direction $\theta_H$ of the hair analysis region B100, i.e. a direction along which the individual hairs 102 may preferably run in the hair analysis region B100, is thus provided from $\lambda_{min}=\min\|D_u f\|_w^2$. A maximum intrinsic value $\lambda_{max}$ of J specifies a direction perpendicular to the main direction.

For the determination of the straightness value, the main direction $\theta_H$, also referred to as orientation, can be determined from $$\theta_H = \frac{1}{2}\arctan\left(2\frac{\langle f_x, f_y\rangle_w}{\langle f_y, f_y\rangle_w - \langle f_x, f_x\rangle_w}\right) + 90 \quad (3)$$

Although a value of the main direction $\theta_H$ might not be relevant per se in various exemplary embodiments, for example because it is dependent on how the hairstyle (or the hair 102) is arranged relative to the x- and y-coordinates, it should be noted that with normal counting 0° point to the east/right and an anticlockwise angle is counted.

A coherence can clearly describe a measure for how strong a dominance of the main direction is (for example the coherence may be 1 if a depicted plurality of individual structures (here: individual hairs) has a dominant main direction, and 0 in the case of an isotropic distribution of the plurality of individual structures (for example of the individual hairs).

The coherence C can be ascertained from:

$$C = \frac{\lambda_{max} - \lambda_{min}}{\lambda_{max} + \lambda_{min}} = \frac{\sqrt{(\langle f_y, f_y\rangle_w - \langle f_x, f_x\rangle_w)^2 + 4\langle f_x, f_y\rangle_w}}{\langle f_x, f_x\rangle_w + \langle f_y, f_y\rangle_w},$$

$$C \in [0 \dots 1]$$

This means that, in the case of straight hairs, which may run substantially parallel to one another, as shown for example in FIG. 1B, and/or for which the profiles of the individual hairs have only minor angular differences from one another, for example less than about 30°, for example less than about 20°, for example less than about 10°, for example less than about 5°, said hairs may have a high coherence value, for example greater than about 0.5, for example greater than about 0.6, for example greater than about 0.7, for example greater than about 0.8, for example greater than about 0.9, for example close to 1, whereas curly hair, as shown for example in FIG. 1A, and/or for which the profiles of the individual hairs have large angular differences from one another, for example more than about 40°, for example more than about 50°, for example more than about 75°, for example more than about 90°, may have a low coherence value, for example less than about 0.5, for example less than about 0.4, for example less than about 0.3, for example less than about 0.2, for example less than about 0.1, for example close to 0.

In various exemplary embodiments the ascertained coherence, which can set the totality of hair profiles in relation to the main direction of the hair profiles, can thus be used as the straightness value of the hairstyle. The straightness value coherence can form a quantitative measure for the straightness of the hairstyle. In various exemplary embodiments in which the hairstyle can be depicted fully in the digital image 100 and the hair analysis region B100 comprises the entire hairstyle, the coherence of one hair analysis region B100 may thus correspond to the straightness value for the entire hairstyle. In various exemplary embodiments in which the hairstyle might only be partially in the digital image 100 and/or the at least one hair analysis region B100 does not comprise the entire hairstyle, the coherence of the at least one hair analysis region B100 may correspond to a straightness value for the hairstyle representative for the at least one hair analysis region B100. In various exemplary embodiments a plurality of hair analysis regions B100 can be evaluated in order to assess a straightness of the entire hairstyle on the basis of a plurality of straightness values thus ascertained.

As clearly described, in the above various exemplary embodiments, it is possible to ascertain, for each of the image dots in the at least one hair analysis region B100, in what direction (for example at what angle) a structure (i.e. hair 102) depicted there runs, and on the basis of these directions a main direction (also referred to as orientation or prevailing direction) can be ascertained, and then the proportion of image dots from the total number of image dots associated approximately with the main direction can be ascertained as a measure for the straightness of the hair 102, wherein the measure, expressed as coherence, can be standardized such that a coherence of 0 is given for an isotropic distribution and a coherence of 1 is given for an orientation of all or substantially all image dots along the main direction.

With use of the coherence as a measure for the straightness of the hair 102, in various exemplary embodiments the structure tensor can be ascertained as described above and is defined for each pixel of the image 100. The coherence is derived from a totality of the structure tensors in various exemplary embodiments.

In various exemplary embodiments the coherence can be a measure for linear components in the image.

In various exemplary embodiments a Fourier component analysis can be performed in order to determine the main direction $\theta_H$. This may be based on a Fourier spectral analysis. Here, structures with a main direction in a (for example) rectangular image in the Fourier-transformed image may generate a periodic pattern of a second direction offset through +90° relative to the main direction of the structures.

In various exemplary embodiments the hair analysis region B100 can be divided for example into rectangular hair analysis region portions, for each of which a Fourier performance spectrum can be calculated. The performance spectra can be examined in polar coordinates, and the performance can be measured for each angle (i.e. each direction) with use of physical filters.

The angles ascertained for each of the individual image dots can be presentable as an angle-frequency distribution. In various embodiments a distribution function, for example a Gaussian curve, can be adapted to the angle-frequency distribution, the center-point of which can specify the main direction $\theta_H$.

In various examples reliability ranges of the distribution function can be used as the straightness value of the hairstyle. For example, a standard deviation of the Gaussian curve can form the straightness value. These data are again circular data, i.e. an angular deviation can be suitable as a measure for a scattering.

The above methods for ascertaining the main direction and the straightness value serve merely for illustration. Alternatively or additionally, other known mathematical methods can be used in order to quantify the property of the hair 102 shown in the image 100 of being arranged running substantially in one direction (or not straight, or only slightly straight).

In various exemplary embodiments a software can be used for the above-described calculations. Here, any software that provides the above-described functionality can be used. In various exemplary embodiments, for example in a case in which a smartphone or a tablet is used to carry out the method for ascertaining a straightness value of a hairstyle, the software can be provided as an app.

Hereinafter, an exemplary use of a known software package "ImageJ" (http://imagej.net) is described which provides various plug-ins which have been developed, inter alia, for analyzing fibrillar cell structures such as collagen fibers, and may be suitable for ascertaining the main direction $\theta_H$ and the straightness value.

Figure 2A:
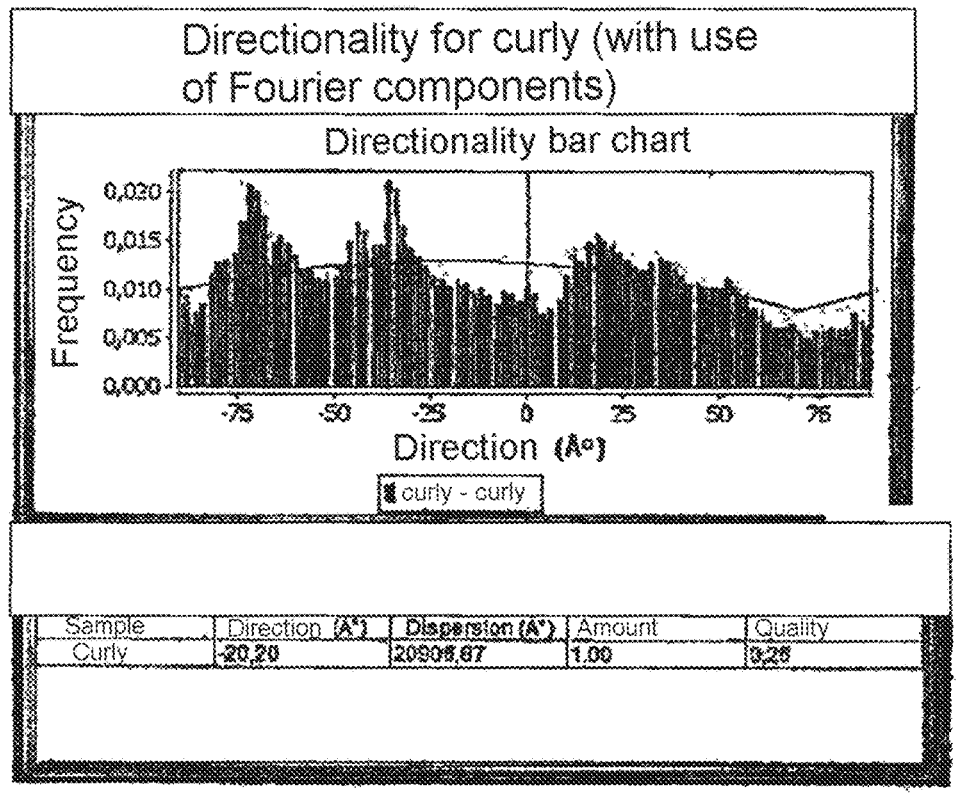
FIG. 2A and FIG. 2B show graphical illustrations of results of the method for ascertaining a straightness value of a hairstyle in accordance with various exemplary embodiments.
Figure 2B:
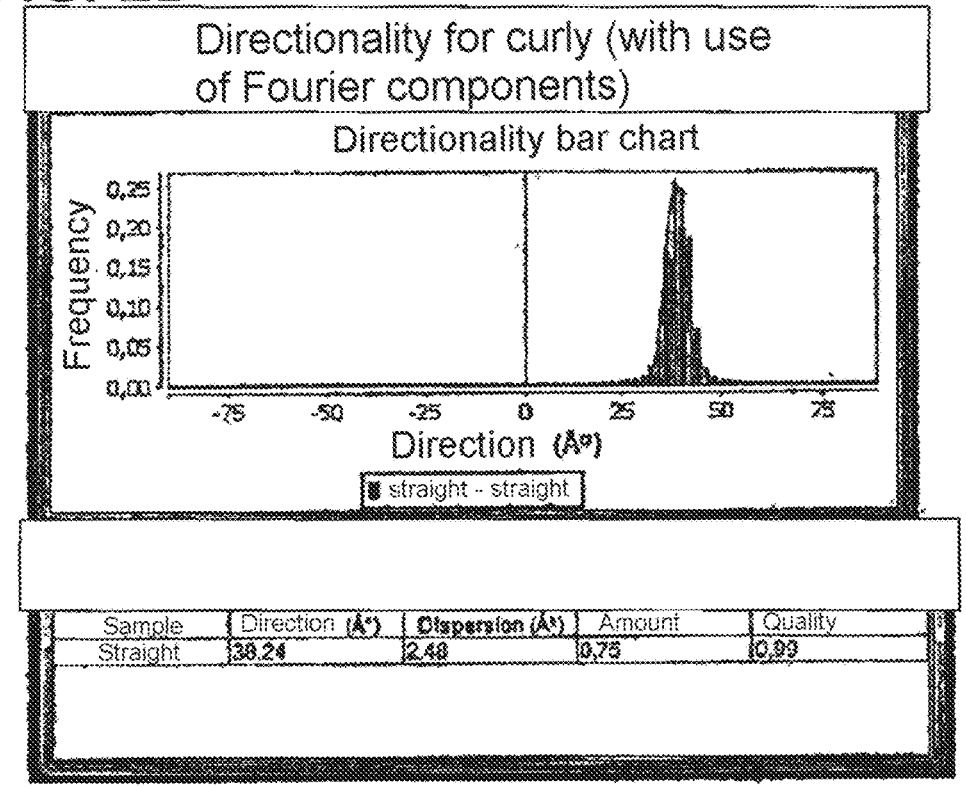

In FIG. 2A and FIG. 2B results are shown in graph form for an application of the plug-in "Directionality" (see http://imageinet/Directionality for a detailed description) in accordance with various exemplary embodiments to the curly hair from FIG. 1A (in FIG. 2A) and to the straight hair from FIG. 1B (in FIG. 2B).

The images 100a, 100b and the hair analysis regions defined therein, which each comprise the entire image, have a resolution of 700×700 image dots, and comparable colors and contrasts are provided in both images.

In FIG. 2A a frequency distribution of the individual image elements in the hair analysis region B100 (here substantially the entire image region) is shown in the upper window in the form of a bar chart presented as number of the image elements (for example as relative frequency) depending on the angle (direction in degrees). A Gaussian curve adapted thereto is additionally shown (as solid line).

As can be seen on the basis of FIG. 2A, the frequency distribution of the image 100a with the curly hair 102 has a distribution that spreads over all angles and that has merely approximately three very broad frequency maxima.

In a lower window of FIG. 2A, calculated results are shown which list the main direction ascertained on the basis of the center-point of the adapted Gaussian curve $\theta_H$ ("direction"), a standard deviation of the Gaussian curve ("dispersion"), an amount that specifies a frequency summed within the standard deviation, and a quality of the Gaussian curve adaptation.

The results show that, for the curly hair 102 from FIG. 1A, there is no expedient adaptation attained and the quality of the adaptation is assessed with a low value of 0.25. This is because neither the direction (of $\theta_H$=)−20.20° coincides with one of the frequency maxima (which lie at approximately −70°, approximately −35° and approximately 20°), nor is an expedient value ascertained for the dispersion (the ascertained value of 20906.87° is many times broader than the frequency distribution extending from −90° to +90°). In view of the very broad dispersion, it is understandable that the amount, which is thus summed over the entire angular range, lies at 1.00 (i.e. 100% of the image elements).

Accordingly, the ascertained values, in particular the dispersion used as straightness value, reflect that the hair 102 shown in the hair analysis region B100 is not straight.

By contrast, the results shown in FIG. 2B for the straight hair 102 from FIG. 1B in the upper window show a frequency distribution heavily concentrated to a range between approximately 30° and 50°, i.e. a mono-modal distribution, for which the maximum of an adapted Gaussian curve (which has a very good goodness of fit of 0.99 with a scale from 0 to 1), as specified in the lower window, corresponds to the ascertained main direction of $\theta_H$=38.24°.

For the standard deviation specified as a dispersion, an expedient value of 2.48° is given, and 75% of the image elements of the hair analysis region B100 lie within a direction range of from (38.24°-2.48°) to (38.24°+2.48°).

Thus, it is quantitatively represented as a straightness value, or dispersion, that the hair profiles in the image from FIG. 1B run substantially in the same direction, and the hair 102 is thus straight.

Figure 3A:
FIG. 3A and FIG. 3B show tables with results of the method for ascertaining a straightness value of a hairstyle in accordance with various exemplary embodiments.
Figure 3B:
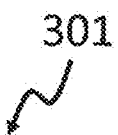

In FIG. 3A and FIG. 3B tables are shown, with results of a method for ascertaining the straightness value of a hairstyle in accordance with various exemplary embodiments, wherein the above-described method utilizing the structure tensor was applied in order to determine these results.

Here the plug-in "OrientationJ" (see http://bigwww.epfl.ch/demo/orientation for a detailed description) was used as software.

FIG. 3A shows the results for the curly hair from FIG. 1A, and FIG. 3B shows the results for the straight hair from FIG. 1B.

For the curly hair an orientation, i.e. a main direction $\theta_H$=−61.09° is determined, and furthermore a coherence of 0.160, which is a low value which lies much closer to an isotropic distribution (with a coherence value of 0) than to a pronounced preferred direction (with a coherence value of 1).

For the straight hair, an orientation, i.e. a main direction $\theta_H$=40.74°, is determined, and furthermore a high coherence of 0.904, which lies much closer to a distribution with a pronounced preferred direction than to an isotropic distribution.

Both the dispersion and the coherence can be suitable in various exemplary embodiments for enabling a differentiation of images with hairstyles of different straightness and for quantifying the linear proportions of the hairstyle that can be decisive for a straightness of the hairstyle.

In various exemplary embodiments a rapid quantitative analysis of an efficacy of various straightening methods can be made possible.

FIG. 4A and FIG. 4B show graphical illustrations explaining a method for ascertaining a straightness value of a hairstyle in accordance with various exemplary embodiments.

In various exemplary embodiments a plurality of hair analysis regions B100 of different size can be used.

In various exemplary embodiments the method may comprise creating a relation of the determined straightness values of the hairstyle to the sizes of the plurality of hair analysis regions B100 (here for example B100_1, B100_2).

In various exemplary embodiments the plurality of hair analysis regions B100 of different size may have the same center-point position, i.e. the hair analysis regions B100 may be centered on the same center point.

In FIG. 4A two hair analysis regions B100_1 and B100_2 of different size are shown in the image 100a.

In various exemplary embodiments the two hair analysis regions B100_1, B100_2 can be examined separately from one another.

Whereas one hair analysis region B100_1 may correspond to the above-described hair analysis region B100, which comprises the entire image 100a, the other hair analysis region B100_2 may be smaller.

In various exemplary embodiments the plurality of hair analysis regions B100_1, B100_2 of different size can be used to obtain a reference point for distinguishing curly hair, which reference point for smaller hair analysis regions B100 may have a main direction with smaller dispersion and/or great coherence, although for a large hair analysis region B100 it may have a large dispersion and/or a small coherence, and untidy hair, which for example for each size of the hair analysis region may have a substantially isotropic distribution with a small coherence and/or a large dispersion.

In various exemplary embodiments, by employing a limiting magnitude of the hair analysis region B100, which, if undershot, means a predefined minimum value for a coherence is exceeded and/or a predefined maximum value for a dispersion is undershot, it is possible to ascertain the size of the linear (for example straight) structures, for example as number of image elements, and/or, for example with the presence of an association of a size of the image elements to a physical size unit, in the form of physical dimensions, for example centimeters.

As can be seen on the basis of FIG. 4A, the hair analysis region B100_1, as shown in FIG. 3A, can comprise hair 102 with a low coherence and a high dispersion, and therefore it does not appear to be possible to provide an expedient specification of a main direction θ.

By contrast, in the smaller hair analysis region B100_2 hair can be displayed that has a main direction θ, which may lie at approximately −70°, and in addition it can be expected that the coherence can be relatively high and the dispersion relatively low. Consequently, straight hair structures which have a size corresponding approximately to the size (for example of an edge length) of the hair analysis region may be present in the smaller hair analysis region B100_2.

In various exemplary embodiments a plurality of differently positioned hair analysis regions B100 can be used, for example hair analysis regions B100_3, B100_4, which have different center-point positions.

In various exemplary embodiments the method may also comprise creating a relation of the ascertained straightness values of the hairstyle to the center-point positions of the plurality of hair analysis regions B100 (here for example B100_3, B100_4).

In various exemplary embodiments the plurality of differently positioned hair analysis regions B100 may differ or have the same size.

In FIG. 4B two differently positioned hair analysis regions B100_3 and B100_4 are shown in the image 100b.

In various exemplary embodiments the two hair analysis regions B100_3, B100_4 can be examined separately from one another.

In various exemplary embodiments the plurality of differently positioned hair analysis regions B100_3, B100_4 can be used to obtain a reference point for a distribution of straight and/or curly hair in a hairstyle. For example, in a hairstyle, the hair 102 close to the scalp may be straight, whereas the hair close to the tips may be curly.

In the example shown in FIG. 4B the hair analysis region B100_3 may have a main direction of great dispersion and/or small coherence, whereas the hair analysis region B100_4 may have a small dispersion and/or a small coherence.

By employing the hair analysis regions B100 distributed in the hair display region, straight regions in the hair display region can be identified, for example in a case in which the hair display region comprises an entire hairstyle.

In various exemplary embodiments a plurality of hair analysis regions B100 can be averaged. This can be achieved with use of appropriate methods from the field of circular statistics.

In various exemplary embodiments the method for determining a straightness value of a hairstyle can be determined prior to the application of a straightening method, for example by employing a conditioner, hair mask, perm, relaxer, straightener and/or straightening iron. For example, it can thus be ascertained whether or at what points a treatment of the hair might be necessary.

Alternatively or additionally, the straightness value can be ascertained in various exemplary embodiments after the application of the straightening method. For example, the efficacy of the straightening method can thus be ascertained. To this end, the ratio of the straightness value after the straightening to the straightness ratio prior to the straightening can be ascertained in various exemplary embodiments.

In various exemplary embodiments the method for determining a straightness value of a hairstyle can be used to ascertain the efficacy of the straightening method.

In various exemplary embodiments a smartphone, a tablet, a laptop or the like may be suitable for carrying out the method for ascertaining the straightness value of a hairstyle. In various exemplary embodiments the software does not need to be produced on the smartphone, the tablet, the laptop, etc. For example, it may be sufficient if the smartphone or the like is connected by the Internet to a computer. In such a case the calculations can be performed for example by employing the computer, and the result can be provided to the smartphone/tablet or the like.

FIG. 5 shows a flow diagram 500 of a method for ascertaining a straightness value of a hairstyle in accordance with various exemplary embodiments.

In various exemplary embodiments the method may comprise a step of ascertaining and/or defining at least one hair analysis region in a digital image, in which hair is depicted (in 510), a step of ascertaining hair profiles of the hair depicted in the at least one hair analysis region, wherein the hair profiles of all hair depicted in the hair analysis region form a totality of the hair profiles (in 520), a step of ascertaining a main direction of the hair profiles (in 530), and a step of ascertaining the straightness value of the hairstyle on the basis of the main direction of the hair profiles and the totality of hair profiles (in 540).

FIGS. 4C through 4H show images 100c, 100d, 100e, 100f, 100g and 100h of hair straightened to different extents for use in a method for ascertaining a straightness value of a hairstyle in accordance with various exemplary embodiments.

In the method for ascertaining the straightness value of a hairstyle, a coherence, i.e. a coherence value, was ascertained in various exemplary embodiments for each of the images 100c to 100h, for example as described above.

In order to increase a comparability of the various images, the individual images are standardized with use of an image processing software in various exemplary embodiments. For example, the images 100 can be processed such that the image details used for the analysis are of the same size, for example in the sense that their pixel numbers match and/or actual dimensions of the depicted hair in the images are the same or similar. Furthermore, for the standardizations, for example color images are converted into greyscale images and/or the intensity of the images is scaled such that the images 100 cover a similar or the same intensity value range, etc.

In various exemplary embodiments one or more of the images 100 can be improved by employing an image processing software, for example sharpness and/or contrast can be increased, which can facilitate the identification of edge profiles. In various exemplary embodiments, Photoshop Lightroom 6 or any other suitable image processing software can be used for the standardization and/or improvement of the images.

For the images in FIG. 4C to FIG. 4H, ascertained coherence values are shown in the following table:

| Image | Coherence [%] |
|---|---|
| Image 1, fiber orientation 1 | 69 |
| Image 2, fiber orientation 2 | 73 |
| Image 3, fiber orientation 3 | 51 |
| Image 4, fiber orientation 4 | 84 |
| Image 5, fiber orientation 5 | 74 |
| Image 6, fiber orientation 6 | 83 |

The following order for the rising degree of straightness can thus be determined on the basis of the ascertained coherence values:
image 4>image 6>image 5>image 2>image 1>image 3.

On the basis of a comparison with a visual assessment of the images in respect of the straightness of the depicted hairstyles, a reliability with which the coherence enables the assessment of the straightness values can be assessed.

For this purpose, 20 different assessors sorted the images 100c, 100d, 100e, 100f, 100g and 100h in accordance with increasing straightness following a visual inspection, the coherence values were converted into ranks, and these were compared with the visually determined ranking order of the assessors on the basis of a Spearman's rank correlation. A Spearman's rank correlation coefficient of $r_s$=0.8 was determined, which can be considered to be a good value in view of differences that are difficult to perceive (clear fluctuations were also encountered among the panel of assessors).

Figure 6:
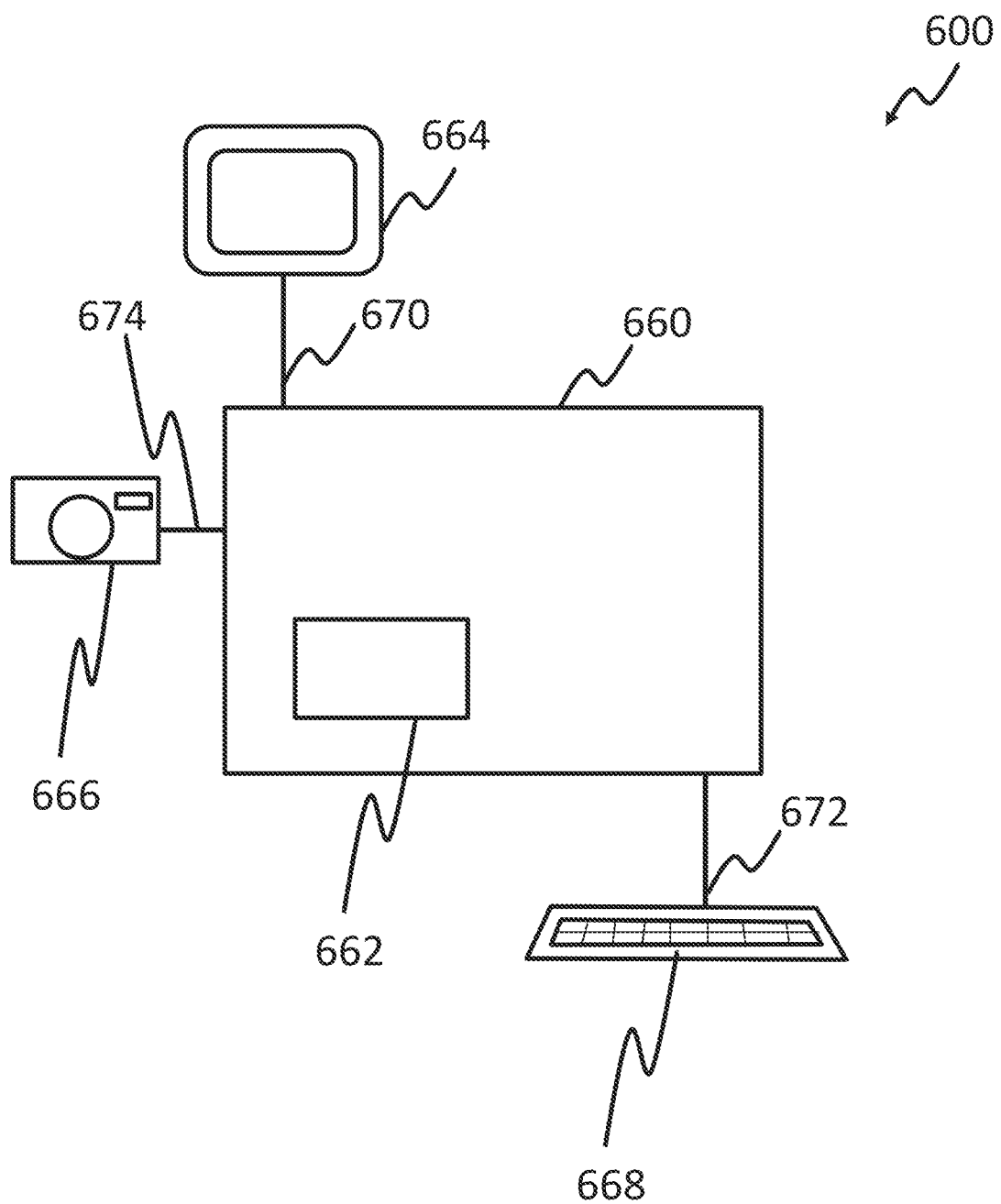
FIG. 6 shows a graphical depiction of a device for ascertaining the straightness value of a hairstyle in accordance with various exemplary embodiments.

FIG. 6 shows a graphical depiction of a device 600 for determining the straightness value of a hairstyle in accordance with various exemplary embodiments.

In various exemplary embodiments the device 600 may comprise a data processing device 660 for determining the straightness value of a hairstyle.

The data processing device 660 may be for example a computer, a tablet, a smartphone, a laptop or any other data processing device which is suitable for carrying out the method for computer-assisted hair color consultation according to various exemplary embodiments. By way of simplification, the data processing device 660 herein is also referred to as a computer 660. The data processing device 660 may comprise a processor 662, for example a microprocessor.

In various exemplary embodiments the device 600 may comprise a display device 664 for determining the straightness value of a hairstyle.

The display device 664 may be for example the screen of a smartphone, of a PC, of a laptop or of another device 600 for determining the straightness value of a hairstyle. The display device 664 may be used for example to display results of the method for determining the straightness value of a hairstyle, or for requesting input parameters for carrying out the method, or the like.

The display device 664 may be connected to the data processing device 660 by employing a first data connection 670. The display device 664 may exchange data with the data processing device 660 by employing the first data connection 670. In the case in which the device 600 comprises a smartphone, a tablet or the like, the display device 664 and the first data connection 670 may be integrated in the device 600.

In various exemplary embodiments the device 600 may comprise a camera 666 for determining the straightness value of a hairstyle.

The camera 666 can be designed in accordance with various exemplary embodiments to record a digital image 100 of hair, for example hair of a user.

The at least one camera 666 in accordance with various exemplary embodiments may comprise a digital camera or a video camera, i.e. a camera which can be designed to record a plurality of individual images as a time sequence.

In various exemplary embodiments the device 600 may comprise a second data connection 674 between the computer 660 and the camera 666 for determining the straightness value of a hairstyle. Data can be transmitted from the computer 660 to the camera 666 by employing the second data connection 674, for example for (for example conventional) software control of the camera 666. Furthermore, data, for example the digital image(s) recorded by the camera 666, can be transmitted to the computer 660 by employing the second data connection 674. In the case in which the device 600 comprises a smartphone, a tablet or the like, the camera 666 and the second data connection 674 may be integrated in the device 600.

In various exemplary embodiments it is possible in the device 600 for determining the straightness value of a hairstyle to dispense with a camera 666, for example if the data processing device 660 is provided with the digital image 100 in some other way, for example by employing data transmission.

The data processing device 660 can be designed to process the image, received from the camera 666 or in some other way, by employing an image processing software, for example with use of the processor 662, for example so as to determine the hair display region in the received image in the known manner and so as to determine the straightness value of a hairstyle as described above for various exemplary embodiments. The image processing software can comprise an app in various exemplary embodiments.

In various exemplary embodiments the data processing device 600 may comprise an input device 668 for providing information to the data processing device 600, for example a keyboard, a mouse, a touch-sensitive surface of the display device 664, or the like.

The input device 668 may be connected to the data processing device 660 by employing a third data connection 672. The input device 668 may exchange data with the data processing device 660 by employing the third data connection 672. In the case in which the device 600 comprises a smartphone, a tablet or the like, the input device 668 and the third data connection 672 may be integrated in the device 600.

Further advantageous embodiments of the method will become clear from the description of the device, and vice versa.

The intensity of the waviness of hair has an influence on the success of a treatment of the hair. The intensity of the waviness of hair has an influence in particular on the treatment of hair with nourishing agents. Accordingly, the determination of a straightness value of a hairstyle can be followed by the output of individual treatment advice depending on the ascertained straightness value.

Accordingly, a further embodiment of the present disclosure is a method for tailored hair treatment, exemplified by the following steps:

a) ascertaining a straightness value of a hairstyle of an individual by employing the method as contemplated herein, and b) outputting an individual treatment instruction depending on the ascertained straightness value.

It is preferred that the individual treatment instruction comprises the recommendation of hair treatment products, in particular haircare products. The recommendation may include the display or specification of a specific product name or hair treatment agent. Alternatively, the recommendation may include the display or specification of a product line or range of a manufacturer.

It may also be preferred that the individual treatment advice consists of determining the straightness value of the hairstyle of the individual in question and recommending the use/recommending against the use of hair treatment products that can be identified to the individual on the basis of QR codes, NFC chips, bar codes or RFID chips.

The individual treatment advice may also lie in ascertaining the chemical composition of a hair treatment product, in particular a haircare product.

Alternatively, the individual treatment advice may consist of recommending to the individual the use of hair treatment products, in particular haircare products, that have been produced individually for the individual and of initiating an ordering process, preferably by loading a website of a manufacturer of individual haircare products.

It is preferred that individuals for whom the hairstyles/hair have/has a low straightness value, for example a coherence less than about 0.3, are advised to use nourishing products that contain a high proportion of fat- or oil-containing ingredients, whereas for hairstyles/hair with a high straightness value, preferably with a coherence greater than about 0.6, haircare products with a low proportion of fat- or oil-containing ingredients are recommended.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method for determining the straightness value of a hairstyle, the method comprising the steps of:
defining at least one hair analysis region in a digital image in which hair is depicted;
ascertaining hair profiles of the hair depicted in the at least one hair analysis region, wherein the hair profiles of all hair depicted in the at least one hair analysis region form a totality of the hair profiles;
ascertaining a main direction of the hair profiles; and
ascertaining the straightness value of the hairstyle on the basis of the main direction of the hair profiles and the totality of hair profiles.

2. The method according to claim 1,
wherein ascertaining the straightness value of the hairstyle on the basis of the main direction of the hair profiles and the totality of hair profiles comprises ascertaining a coherence with use of a structure tensor and/or ascertaining a dispersion of an angular distribution of the totality of hair profiles.

3. The method according to claim 1,
wherein defining at least one hair analysis region comprises defining the at least one hair analysis region by a user.

4. The method according to claim 3,
wherein defining the at least one hair analysis region by the user comprises defining a position and/or shape and/or size of the hair analysis region.

5. The method according to claim 1,
wherein defining at least one hair analysis region comprises:
ascertaining a hair display region in which the hair is depicted in the digital image; and
defining at least part of the hair display region as the at least one hair analysis region.

6. The method according to claim 5,
wherein the at least one hair analysis region comprises the entire hair display region.

7. The method according to claim 1,
wherein the at least one hair analysis region comprises a plurality of hair display regions.

8. The method according to claim 7,
wherein the plurality of hair display regions differs from one another in their center-point position.

9. The method according to claim 7,
wherein the plurality of hair display regions differs from one another in their size.

10. The method according to claim 7,
wherein the plurality of hair display regions has a common center-point position.

11. The method according to claim 8, further comprising a step of:
creating a relation of the ascertained straightness value to the center-point positions of the hair display regions.

12. The method according to claim 9, further comprising a step of:
creating a relation of the ascertained straightness values of the hairstyle to the sizes of the hair display regions.

13. The method according to claim 1, further comprising a step of:
displaying the straightness value.

14. A device for determining the straightness value of a hairstyle,
comprising:
a data processing device; and
a display device;
wherein the data processing device is configured to:
define at least one hair analysis region in a digital image in which hair is depicted;
ascertain hair profiles of the hair depicted in the at least one hair analysis region, wherein the hair profiles of all hair depicted in the hair analysis region form a totality of the hair profiles;
ascertain a main direction of the hair profiles; and
ascertain the straightness value of the hairstyle on the basis of the main direction of the hair profiles and the totality of hair profiles.

15. A method for tailored hair treatment, the method comprising the steps of:
defining at least one hair analysis region in a digital image in which hair is depicted;
ascertaining hair profiles of the hair depicted in the at least one hair analysis region, wherein the hair profiles of all hair depicted in the at least one hair analysis region form a totality of the hair profiles;
ascertaining a main direction of the hair profiles; and ascertaining a straightness value of the hair depicted in the at least one hair analysis region on the basis of the main direction of the hair profiles and the totality of hair profiles, and outputting an individual treatment instruction depending on the ascertained straightness value.

16. The method of claim 15, wherein outputting an individual treatment instruction comprises recommending the use of a hair treatment product.

17. The method according to claim 15,
   wherein ascertaining the straightness value of the hair in the at least one hair analysis region on the basis of the main direction of the hair profiles and the totality of hair profiles comprises ascertaining a coherence with use of a structure tensor and/or ascertaining a dispersion of an angular distribution of the totality of hair profiles.

18. The method according to claim 15,
   wherein defining the at least one hair analysis region comprises defining a position and/or shape and/or size of the at least one hair analysis region.

19. The method according to claim 15,
   wherein defining at least one hair analysis region comprises:
   ascertaining a hair display region in which the hair is depicted in the digital image; and
   defining at least part of the hair display region as the at least one hair analysis region.

20. The method according to claim 19,
   wherein the at least one hair analysis region comprises a plurality of hair display regions.

\* \* \* \* \*